United States Patent [19]

Graefe

[11] Patent Number: 5,087,514
[45] Date of Patent: Feb. 11, 1992

[54] THERMOPLASTIC RESIN LAYER CHEMICALLY BONDED TO THERMOSET RESIN LAYER

[75] Inventor: Peter U. Graefe, Wayside, N.J.

[73] Assignee: Intellex Corporation, Uniondale, N.Y.

[21] Appl. No.: 400,669

[22] Filed: Aug. 30, 1989

[51] Int. Cl.$^5$ .................... B32B 3/26; B32B 7/04; B32B 7/10
[52] U.S. Cl. .................... 428/315.5; 428/315.7; 428/319.3; 428/319.7; 428/409; 428/420
[58] Field of Search .............. 428/420, 409, 319.7, 428/319.3, 315.9, 315.7, 315.5

[56] References Cited

U.S. PATENT DOCUMENTS

| | | | |
|---|---|---|---|
| Re. 27,430 | 7/1972 | Wimmer | 220/64 |
| 2,515,112 | 7/1950 | Burford, III | 421/241 |
| 3,080,267 | 3/1963 | Schmalz | 428/319.3 |
| 3,720,540 | 3/1973 | Wimmer | 428/430 |
| 3,859,401 | 1/1975 | Gallap et al. | 428/319.7 |
| 4,053,545 | 10/1977 | Fay | 264/46.4 |
| 4,105,734 | 8/1978 | Nakagawa | 264/132 |
| 4,215,096 | 7/1980 | Sinha et al. | 423/241 |
| 4,292,287 | 9/1981 | Orlett et al. | 423/241 |
| 4,312,693 | 1/1982 | Salensky et al. | 156/272 |
| 4,315,808 | 2/1982 | Imada et al. | 204/169 |
| 4,317,788 | 3/1982 | Imada et al. | 264/22 |
| 4,452,679 | 6/1984 | Dunn et al. | 204/164 |
| 4,548,867 | 10/1985 | Ueno et al. | 428/409 |
| 4,594,231 | 6/1986 | Nishino et al. | 423/210 |
| 4,664,982 | 5/1987 | Genovese et al. | 428/447 |
| 4,690,097 | 9/1987 | Fukuta et al. | 118/723 |
| 4,714,650 | 12/1987 | Obayashi et al. | 428/265 |
| 4,752,428 | 6/1988 | Williams et al. | 264/83 |
| 4,771,110 | 9/1988 | Bauman et al. | 525/131 |
| 4,784,904 | 11/1988 | Wood et al. | 428/317.9 |
| 4,800,053 | 1/1989 | Bauman et al. | 264/83 |
| 4,820,580 | 4/1989 | Hocker et al. | 428/314.4 |
| 4,822,652 | 4/1989 | Sempio et al. | 428/34.5 |
| 4,828,871 | 5/1989 | Strobel et al. | 427/39 |
| 4,836,901 | 6/1989 | Manabe et al. | 204/164 |
| 4,844,944 | 7/1989 | Graefe et al. | 428/357 |
| 4,844,955 | 7/1989 | Graefe et al. | 428/420 |
| 4,956,224 | 9/1990 | Leca | 428/213 |

FOREIGN PATENT DOCUMENTS

| | | | |
|---|---|---|---|
| 904763 | 8/1962 | United Kingdom | 428/36.5 |
| 2040676 | 9/1980 | United Kingdom | |
| 2148786 | 6/1985 | United Kingdom | 428/319.7 |

OTHER PUBLICATIONS

Coopes et al., "Gas Plasma Treatment of Polymer Surfaces", *J. Macromol. Sci.-chem.*, A17 (2), pp. 217-226 (1982).

*Primary Examiner*—William J. Van Balen
*Attorney, Agent, or Firm*—Rocco S. Barrese; Peter G. Dilworth

[57] ABSTRACT

A polymeric resin laminate is manufactured by bonding the molecularly-modified, adhesion-improved surface of a rigid thermoplastic resin layer to a thermoset resin layer, advantageously, in a reaction injection molding operation.

31 Claims, 3 Drawing Sheets

THERMOPLASTIC RESIN LAYER CHEMICALLY BONDED TO THERMOSET RESIN LAYER

BACKGROUND OF THE INVENTION

This invention relates to a polymeric resin laminate possessing a rigid thermoplastic resin layer bonded to a thermoset resin layer and to a process and apparatus for the manufacture of the laminate.

The goal of bonding the same, similar or totally dissimilar layers of polymeric resin materials to provide a laminate product of reliable and durable performance poses a problem of materials engineering for which a practical and effective solution is often elusive. This is particularly true where a rigid thermoplastic resin layer is to be bonded to a thermoset resin layer. Even after relatively brief periods of service, contact adhesives frequently fail with consequent delamination of the component layers of the laminate article.

Frequent cycles of dynamic stress and/or thermal cycling applied to a polymeric resin laminate tend to accelerate adhesive failure. In the case of sanitary ware products such as bathtubs, sinks, etc., of laminate construction in which a rigid thermoplastic resin cosmetic layer is bonded to an underlying thermoset reinforcing layer, the problem of achieving permanent, or at least long-term, adhesion of the two layers to each other is a particularly difficult and challenging one. Similarly, in the case of laminated automotive body panels, particularly those associated with the engine compartment, wide temperature variations coupled with internal mechanical and road-induced stresses tend to accelerate the delamination process.

The chemical bonding of dissimilar organic polymer layers is known. The bonding principle involves the chemical reaction of reactive functional groups in one layer with reactive functional groups in an adjacent layer to form covalent bonds between the two layers. This approach has been used to achieve chemical bonding between a rigid thermoplastic resin layer and a thermoset resin layer. Up until now, the rigid thermoplastic resin layer has either possessed chemically reactive functional groups as part of its bulk molecular structure or a material possessing such groups has been incorporated into the bulk resin in order for chemical bonding to occur by reaction with other chemically reactive groups present in the thermoset resin-forming composition providing the thermoset resin layer of the laminate.

These approaches to obtaining chemical bonding between a rigid thermoplastic layer and a thermoset resin layer are subject to a variety of drawbacks. If, on the one hand, the rigid thermoplastic resin must possess chemically reactive functional groups as part of its bulk molecular structure, such a requirement will greatly narrow the field of suitable resins providing this layer of the laminate since relatively few rigid thermoplastic resins possess chemically reactive functional groups. Furthermore, the presence of chemically reactive groups in the bulk thermoplastic resin is generally undesirable as these tend to enter into extraneous reactions which can degrade the mechanical, chemical and/or esthetic properties of the resin and the laminate layer formed therefrom. On the other hand, if a material possessing chemically reactive functional groups is incorporated into a chemically inert rigid thermoplastic resin, there is always the possibility that over time, the added material will prove to be incompatible with the host resin such that sooner or later, delamination will result. And, of course, the problem of extraneous reactions to which the chemically reactive groups are liable constitutes still another drawback to this approach to achieving chemical bonding in a laminate. Perhaps because of these disadvantages, laminates possessing chemically bonded layers have had limited application. Most chemically bonded laminates have been based on fairly specialized chemistry which is not readily generalized for other applications.

A variety of procedures are known for treating the surfaces of polymeric materials to improve their bondability or adherence to other materials including dissimilar polymers. These procedures include treating the exposed surfaces of polymeric materials with chemical reagents, plasmas or other types of electron bombardment to modify the molecular structure of the surface polymer without affecting the bulk properties of the resin. However, it is believed that heretofore, none of these surface treatment procedures have been utilized in the manufacture of a polymeric resin laminate in which a rigid thermoplastic resin layer is chemically bonded to a thermoset resin layer.

SUMMARY OF THE INVENTION

It is a principle object of the present invention to provide a polymeric resin laminate possessing a rigid thermoplastic resin layer bonded to the molecularly-modified, adhesion-improved surface of a thermoset resin layer.

It is a particular object of the invention to provide such a laminate in which a relatively thin rigid thermoplastic resin layer serving as a cosmetic or appearance-enhancing component is bonded to a relatively thick rigid thermoset resin layer serving as a reinforcement or backing component for the cosmetic component.

Other specific objects of the invention include a reaction injection molding (RIM) process and apparatus in which the exposed surface of a rigid thermoplastic resin preform, e.g., an acrylic bathtub shell or an automotive vehicle body panel, which has previously been placed or formed within the mold cavity is treated therein to improve its adhesion for a thermoset resin layer subsequently formed against the treated surface.

In keeping with these and other objects of the invention, a polymeric resin laminate is provided which comprises:

a) a rigid thermoplastic resin layer possessing a molecularly-modified, adhesion-improved surface, the properties of the bulk resin remaining substantially unaffected by the molecular modification of such surface; and, b) a thermoset resin layer in adherent contact with the molecularly-modified, adhesion-improved surface of the rigid thermoplastic resin layer.

The foregoing polymeric resin laminate is manufactured by the process which comprises:

a) modifying the molecular structure of polymer at the surface of a rigid thermoplastic resin layer to improve the adhesion property of such surface without appreciably affecting the properties of the bulk resin; and, b) forming a thermoset resin layer in adherent contact with the molecularly-modified, adhesion-improved surface of the rigid thermoplastic layer.

In one embodiment of the foregoing process, the rigid thermoplastic resin layer is provided as a preform which is placed or formed within the cavity of a reaction injection mold, step (a) is carried out upon the exposed surface of the preform in situ and step (b) is carried out upon the surface-treated preform under reaction injection molding conditions to provide the shaped polymeric laminate article. A reaction injection molding apparatus which is suitable for use in practicing this embodiment of the invention comprises:

a) a male mold unit;
 b) a female mold unit which, when joined with the male mold unit, forms a sealed mold defining a complete mold cavity within;
 c) means for modifying the molecular structure of polymer at the surface of a rigid thermoplastic resin preform present within the cavity of the sealed mold to improve the adhesion property of such surface without appreciably affecting the properties of the bulk resin; and,
 d) means for introducing a metered amount of flowable thermoset resin-forming composition into the mold cavity, said composition contacting the molecularly modified surface of the rigid thermoplastic resin preform.

Without wishing to be bound, it is believed that the molecular modification of the polymer at the surface of the rigid thermoplastic resin results in the formation of chemically reactive functional groups, e.g., carboxylic acid groups, hydroxyl groups, carbonyl groups, etc., which react with chemically reactive functional groups possessed by one or more components of the thermoset resin-forming composition subsequently placed in contact with the molecularly-modified surface of the rigid thermoplastic resin. The chemical reaction is believed to result in strong covalent bonds which chemically bond the mutually contacting surfaces of the two layers to each other. This explanation of the mechanism by which enhanced bonding of the layers may be achieved in the laminate and laminate manufacturing process of this invention is at present a speculative one and is not intended to restrict the scope of the invention in any way.

The laminate of this invention can be readily formed into a wide variety of useful articles, e.g., items of sanitary ware such as bathtubs, shower receptors, lavatories, kitchen sinks, etc., automotive vehicle body panels, structural panels, door panels, furniture and furniture components such as table tops and counter tops, housings for machinery and appliances, cabinets for electronic and computer equipment, and so forth, which are notable for their attractive appearance, exceptionally good mechanical properties relative to weight and high corrosion resistance.

BRIEF DESCRIPTION OF THE DRAWINGS

In the foregoing figures, the same reference numerals are used throughout to refer to the following elements.

| Reference Numeral | Element |
| --- | --- |
| 10 | the reaction injection molding apparatus indicated generally with matched male mold (plug) and female mold elements 11 and 12, respectively, joined to provide a sealed mold |
| 11 | male mold unit |
| 12 | female mold unit |
| 13 | parting line of sealed mold |
| 14 | mold cavity |
| 15 and 15' | male mold unit shaping surfaces corresponding to interior side wall surfaces 33 and 33' of finished bathtub 32 |
| 16 | male mold unit shaping surface corresponding to interior bottom surface 34 of finished bathtub 32 |
| 17 and 17' | female mold unit shaping surfaces corresponding to exterior side wall surfaces 35 and 35' of finished bathtub 32 |
| 18 | female mold unit shaping surface corresponding to exterior bottom surface 36 of finished bathtub 32 |
| 19 | two-component mixing head unit for injecting a metered amount of a flowable, substantially homogeneous thermoset resin-forming composition, e.g., one providing a rigid, dense microcellular polyurethane foam, into mold cavity 14 |
| 20 | hydraulic piston |
| 21 | low pressure recirculation path of thermoset resin Component A, e.g., polyol (FIGS. 1 and 3) |
| 22 | low pressure recirculation path of thermoset resin Component B, e.g., polyisocyanate (FIGS. 1 and 3) |
| 23 | high pressure impingement mixing/injection path of thermoset resin Component A (FIG. 2) |
| 24 | high pressure impingement mixing/injection path of thermoset resin component B (FIG. 2) |
| 25 | high pressure impingement mixing zone (FIG. 2) |
| 26 | injection port |
| 27 | rigid thermoplastic resin preform, e.g., one fabricated from an acrylic resin such as poly(methyl methacrylate) (PMMA), providing the cosmetic layer of finished bathtub 32 |
| 28 | exposed surface of preform 27 |
| 29 | self-supporting glass fiber web preform providing reinforcement of the thermoset resin (backing) layer |
| 30 | longitudinal stiffener, e.g., a plywood plank |
| 31 | flowable thermoset resin-forming composition (FIG. 2), e.g., a polyurethane resin-forming composition comprising a substantially homogeneous mixture of polyol and polyisocyanate |
| 31' | cured thermoset resin backing layer (FIG. 3) bonded to rigid thermoplastic cosmetic layer 27 |
| 32 | finished bathtub (shown in cross sectional perspective view in FIG. 4) |
| 33 and 33' | interior side wall surfaces of finished bathtub 32 |
| 34 | interior bottom surface of finished bathtub 32 |
| 35 and 35' | exterior side wall surfaces of finished bathtub 32 |
| 36 | exterior bottom surface of finished bathtub 32 |
| 37 | pressurized source of fluorine gas |
| 38 | valve |
| 39 | fluorine gas input line |
| 40 | fluorine-air mixture evacuation line |
| 41 | valve |
| 42 | transfer pump |
| 43 | fluorine-air mixture transfer line |
| 44 | main fluorine separation unit selectively |

-continued

| Reference Numeral | Element |
| --- | --- |
| | operated in fluorine sorption and fluorine desorption modes |
| 45 | electric heating coil selectively operated at fluorine sorption and fluorine desorption temperatures |
| 46 | fluorine-sorptive material, e.g., sintered pellets of anhydrous potassium nickel hexafluoride |
| 47 | desorbed fluorine transfer line |
| 48 | valve |
| 49 | transfer pump |
| 50 | desorbed fluorine holding tank |
| 51 | desorbed fluorine transfer line |
| 52 | valve |
| 53 | transfer pump |
| 54 | desorbed fluorine recycle line |
| 55 | residual fluorine-air mixture transfer line |
| 56 | valve |
| 57 | transfer pump |
| 58 | auxiliary fluorine separation unit |
| 59 | vent for fluorine-free air |

DESCRIPTION OF THE PREFERRED EMBODIMENTS

Reaction injection molding involves a one-shot injection of a flowable, substantially homogeneous mixture of polymerizable components into a sealed mold where rapid polymerization occurs resulting in a molded resin product which may be of the thermoplastic, elastomeric or thermosetting variety depending on the relative number of crosslinks which may be present. In a typical reaction injection molding process, the viscosity of the resin-forming composition introduced into the mold cavity ranges from about 50 cps to about 10,000 cps, preferably from about 500 cps to about 5000 cps, temperatures generally vary from about ambient to about 150° C. and mold cavity pressures generally range from about 30 psig to about 200 psig, preferably from about 50 psig to about 100 psig. In a reaction injection molding process, the polymerization reaction takes place fairly rapidly, e.g., in less than about 5 minutes and frequently in less than about 2 minutes. For further details regarding known types of reaction injection molding apparatus and processes, reference may be made to Sweeney, "Introduction to Reaction Injection Molding", Technomics, Inc. (1979) as well as to the considerable patent literature on the subject.

Figure 1:
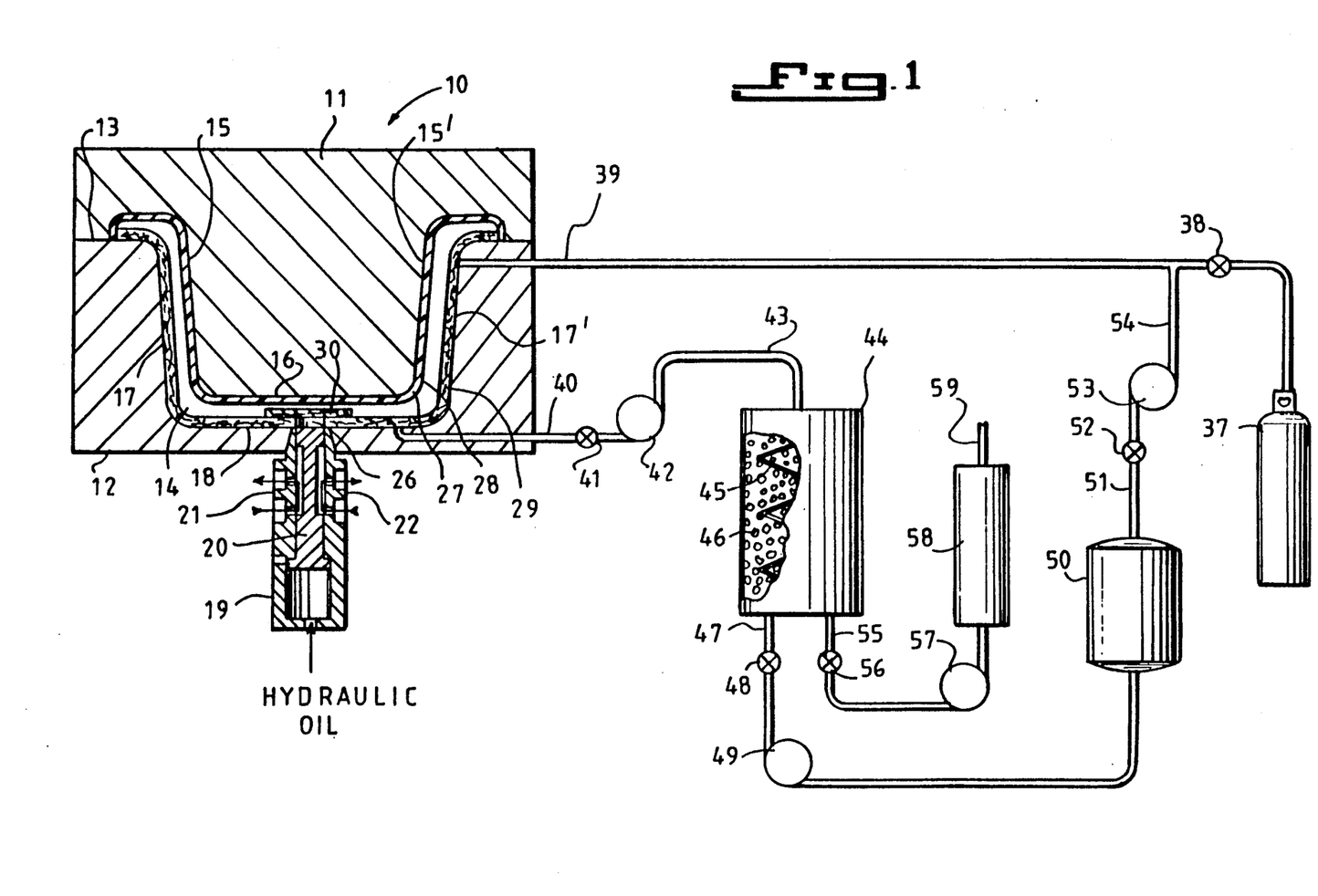
FIGS. 1-3 are schematic cross sectional illustrations of various stages of operation of a reaction injection molding apparatus provided with means for the surface treatment of a rigid thermoplastic resin preform in situ as part of a process for manufacturing a polymeric resin laminate in accordance with this invention; and, FIG. 4 is a perspective view of a section of a finished laminate product, specifically, a bathtub, obtained from the reaction injection molding apparatus and process illustrated in FIGS. 1-3.
Figure 2:
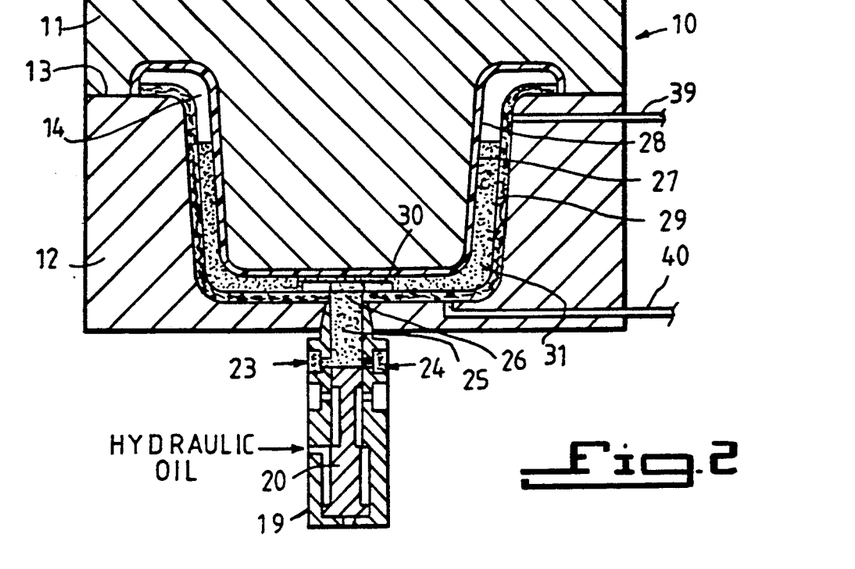
Figure 3:
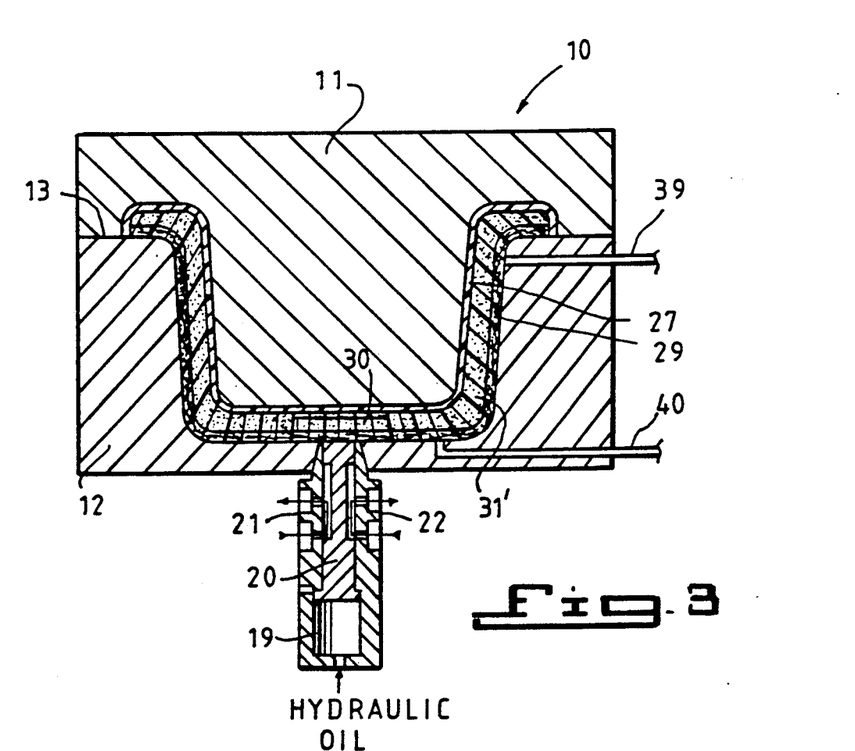

Referring to FIGS. 1-4, reaction injection molding apparatus 10 is shown in the sealed condition, obtained by joining male mold unit (plug) 11 to female mold unit 12 along parting line 13 thereby defining mold cavity 14 within. Male mold unit 11 possesses shaping surfaces 15 and 15' corresponding to interior side wall surfaces 33 and 33' of finished bathtub 32 and shaping surface 16 corresponding to interior bottom surface 34 of finished bathtub 32. Female mold unit 12 possesses shaping surfaces 17 and 17' corresponding to exterior side wall surfaces 35 and 35' of finished bathtub 32 and shaping surface 18 corresponding to exterior bottom surface 36 of finished bathtub 32. A two-component mixing head unit 19 of a known type is provided for the purpose of injecting a metered amount of a flowable, substantially homogeneous thermoset resin-forming composition, e.g., one providing a rigid, dense microcellular polyurethane foam, into mold cavity 14 of sealed mold 10. When, as illustrated in FIGS. 1 and 3, mixing head unit 19 is other than in the injection mode, the separate components of the thermoset resin-forming composition are in a constant relatively low pressure recirculation mode. Thus, e.g., in the case of a polyurethane foam derived from the reaction of a polyol (Component A) with a polyisocyanate (Component B), hydraulically actuated piston 20 assumes a position which seals injection port 26 simultaneously providing relatively low pressure recirculation of the polyol along the path indicated by arrow 21 and relatively low pressure recirculation of the isocyanate along the path indicated by arrow 22. However, when, as illustrated in FIG. 2, mixing head unit 19 is shifted from the recirculation mode to the injection mode, hydraulic piston 20 is repositioned to allow relatively high pressure impingement mixing of the two components of the thermoset resin-forming composition, in the example mentioned, polyol and polyisocyanate, in mixing zone 25. When the predetermined amount of thermoset resin-forming composition has been introduced into mold cavity 14, hydraulic piston 20 returns to the recirculation mode position sealing injection port 26 and terminating the injection mode sequence.

Prior to sealing mold 10, a rigid thermoplastic resin preform 27, e.g., one fabricated from an acrylic resin such as poly(methyl methacrylate) (PMMA), providing the cosmetic layer of finished bathtub 32 is placed against shaping surfaces 15, 15' and 16 of male mold unit 11, self-supporting glass fiber web preform 29 is placed against shaping surfaces 17, 17' and 18 of female mold unit 12 and a longitudinal stiffener 30, e.g., a plywood plank, is placed upon glass fiber web preform 29. Glass fiber web preform 29 and plank 30 each possesses a passageway in common alignment with injection port 26. These passageways facilitate the flow of thermoset resin-forming composition 31 into mold cavity 14 during the injection operation. Rigid thermoplastic resin preform 27 is positioned within cavity 14 of sealed mold 10 such that its exposed lower surface 28 and female mold unit shaping surfaces 17, 17' and 18 taken together constitute the shaping surfaces for thermoset resin backing layer 31' which is to be formed therein.

Figure 4:
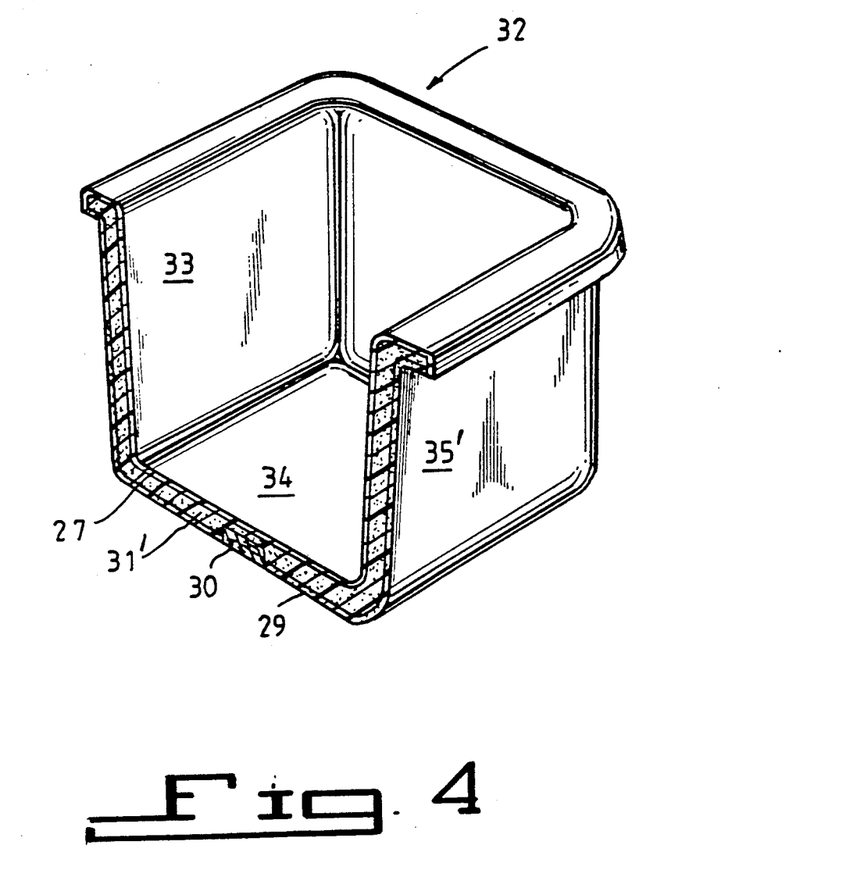

The rigid thermoplastic resin from which preform 27 is fabricated can be any of a large variety of such materials, e.g., polyolefin homopolymers and/or copolymers such as linear low density polyethylene, high density polyethylene, polypropylene, ethylene-propylene copolymer, etc.; polyvinyl ethers; poly(phenylene ethers); acetal resins; thermoplastic polyesters such as polyethylene terephthalate and polybutylene terephthalate; polycarbonates; cellulose esters such as cellulose acetate, cellulose acetate butyrate and cellulose acetate propionate; thermoplastic polyamides; thermoplastic polyurethanes; polyvinylhalides such as polyvinyl chloride and polytetrafluoroethylene; polyvinylidene halides such as polyvinylidene chloride; halogenated polyolefins such as chlorinated polyethylene; acrylic homopolymers and copolymers such as poly(methyl methacrylate); ionomer resins; polystyrenes; polyacrylonitriles; polyvinylesters such as polyvinylacetate; polyimides; polyetherimides; polysulfones; interpenetrating polymer networks (IPNs) and simultaneous interpenetrating polymer networks (SINs); and, polymer alloys or blends of these and similar resins. The resins can, if desired, contain one or more additives of the usual kind, e.g., fillers, fibrous reinforcements, processing aids, colorants, pigments, stabilizers, etc., in the usual amounts. Preform 27 and preforms of other configurations can be fabricated by any suitable plastic shaping method including thermoforming, in particular vacuum forming, blow molding, compression molding, injection molding, etc. In view of its application as the surface, or cosmetic, layer of finished bathtub 32, preform 27 is advantageously fabricated from a thermoplastic resin exhibiting good flame retardancy, heat and moisture resistance, scratch resistance, detergent resistance, impact strength and colorability and, in addition to such useful physical properties, pleasing appearance and high gloss. Resins which comply to a great extent with the foregoing criteria and as such are particularly suitable for the fabrication of preform 27 are acrylic resins, poly(phenylene ethers) such as the NORYL resins (General Electric Co.) polyetherimides such as the ULTEM resins (General Electric Co.) and ionic resins such as the SURYLNs (DuPont). Acrylic resins such as poly(methyl methacrylate) (PMMA) are especially preferred due to the relative ease with which they can be thermoformed to provide shapes such as those of preform 27, their low cost compared to other resins exhibiting similar properties and their ready availability.

Self-supporting glass fiber web preform 29 possesses an overall configuration corresponding approximately to that of finished bathtub 32. In addition to glass, preform 29 can be fabricated from any of a variety of other fibrous reinforcement materials such as ceramic fiber, asbestos fiber, metallic fiber, carbon fiber, aramid fiber, etc. Preform 29 can be woven or non-woven and can be manufactured from continuous strand or chopped fiber. One suitable method for providing glass fiber web preform 29 is disclosed in U.K. Patent Application GB 2 015 915 A, the contents of which are incorporated by reference herein. As applied to the fabrication of preform 29, this method comprises supplying chopped glass fiber to a jet of finely-divided liquid, e.g., water, containing a temporary binder for the glass fiber, e.g., polyvinyl acetate, directing the jet against the surface of a former to build up preform 29 thereon to the desired thickness and, finally, drying the preform.

Before coming into contact with flowable thermoset resin-forming composition, lower surface 28 of rigid thermoplastic resin preform 27 must be treated to improve its adhesion property. This can be accomplished by any procedure which modifies the molecular structure of the resin at such surface without appreciably affecting the properties of the bulk resin, such molecular modification resulting in the required improved adhesion of the treated surface. In general, the modified molecular structure will extend to a depth of only a few nanometers, e.g., to about 10 nanometers at most and usually not more than about 5 nanometers.

A variety of procedures are known for modifying the surface of a thermoplastic resin which can be utilized herein to provide the aforestated adhesion-improved surface. Thus, e.g., lower surface 28 of rigid thermoplastic resin preform 27 can be subjected to gas plasma treatment or other energetic electron bombardment treatment which results in the modification of the polymer in this region. One such treatment involves the application of an electrical discharge to surface 28 under appropriate conditions, e.g., a voltage of from about 100 to about 200 volts at a static capacity of about 40 to about 100 microfarads and at a short circuit current of from about 1 to about 2 amperes. Useful gas plasma treatments involve contacting surface 28 with partially ionized gases containing equal concentrations of positive and negative charge carriers produced by strong electric or magnetic fields. The plasmas can be produced at relatively low temperatures, e.g., from ambient temperature to about 160° C., by corona discharge at atmospheric pressure or by radio frequency glow discharge at low pressure, e.g., 10 torr or less, for treatment times of from about 0.1 seconds to several minutes in the presence of such gases as oxygen, nitrogen and/or nitrogen-containing compounds such as nitrogen oxide, an amine, an imide, an amide, etc., a sulfur-containing compound such as sulfur dioxide, sulfur trioxide, etc., helium, argon, halogen and/or halogen-containing compound, the use of which in gas plasma treatment of polymer surfaces is known (see, e.g., U.S. Pat. Nos. 4,312,693; 4,315,808; 4,317,788; 4,452,679; 4,548,867; 4,690,097; 4,714,650; 4,820,580; 4,828,871; and, 4,836,901 and, Coopes et al., "Gas Plasma Treatment of Polymer Surfaces," *J. Macromol. Sci.-Chem.*, A17(2), pp. 217-226 (1982), the disclosures of which are incorporated by reference herein).

Several purely chemical procedures which can be adapted herein to effect the molecular modification of surface 28 of rigid thermoplastic resin preform 27 are described in U.S. Pat. Nos. 4,752,428; 4,771,110; and, 4,800,053, the contents of which are incorporated by reference herein. These procedures utilize a gaseous mixture comprising fluorine and/or a fluorine-containing gas and at least one other reactive gas, e.g., oxygen conveniently supplied as ambient atmosphere, within a sealed reaction chamber. In the case of a preferred gaseous mixture, namely, fluorine and oxygen, the atmosphere within the sealed treatment chamber can contain from about 0.1 to about 50 mole percent fluorine and at least about 100 ppm oxygen. Pressure and/or temperature within the treatment chamber can be maintained below, at or above ambient with contact times of only a fraction of a second up to several seconds, even minutes, ordinarily being sufficient to improve the adhesion property of exposed surface 28 of preform 27.

The treatment of exposed surface 28 of preform 27 by these or other polymer structure-modifying procedures can be carried out in a separate upstream operation or, as in the preferred embodiment of the invention illustrated in FIGS. 1-3, it can be carried out within mold cavity 14 of sealed reaction injection mold 10, e.g., employing a reactive gaseous mixture of fluorine and oxygen (provided as ambient air) in accordance with the chemical surface modification procedures referred to above. In accordance with this embodiment of the invention, a stream of fluorine gas from pressurized cylinder 37 controlled by valve 38 is introduced into mold cavity 14 via line 39 where it mixes with oxygen present in the air already present in the cavity to provide the preferred reactive gaseous composition referred to above. Following the desired period of contact with the gaseous fluorine-oxygen mixture, the adhesion property of exposed surface 28 of preform 27 will have been improved, possibly by having become chemically reactive for one or more components of thermoset resin-forming composition 31 which is introduced into mold cavity 14 in the subsequent reaction injection molding operation. Thus, when thermoset resin-forming composition 31 is one providing a polyurethane, polyurethane-polyurea, polyurea or polyester-polyurethane hybrid resin and as such contains a polyisocyanate component, it is thought that treated surface 28 of preform 27 will chemically react with this component to provide a laminate article, in the case illustrated, bathtub 32, in which preform 27 is chemically bonded to underlying thermoset layer 31' at their mutually contacting surfaces.

For the foregoing embodiment, the materials of construction of mold 10 should be selected with resistance to fluorine corrosion in mind. Metals such as Monel, aluminum, stainless steel and carbon steel, preferably stainless steel, are suitable materials for the construction of article shaping surfaces, transfer lines, etc. Alternatively, the surfaces of mold components which come into contact with fluorine can be coated with a corrosion-resistant material, e.g., a highly fluorinated polymer such as polytetrafluoroethylene (PTFE). Such polymers are also suitable for use in the construction of gaskets, and the like, which may come into contact with gaseous fluorine.

Following the surface treatment of preform 27, excess fluorine together with the gas with which it is admixed, e.g., air, is evacuated from mold cavity 14 through line 40, either before or during the filling of the mold cavity with flowable thermoset resin-forming composition 31, and is conveyed by pump 42 across valve 41 through transfer line 43 to main fluorine separation unit 44 which is operated under conditions providing the removal of at least a major amount of the fluorine from the other gas. The fluorine-depleted gas is thereafter conveyed through line 55 across valve 56 by pump 57 to and through auxiliary fluorine separation unit 58 where any residual fluorine is completely removed, the fluorine-free gas being vented therefrom through line 59. When, as in this embodiment, a main fluorine separation unit is accompanied by one or more auxiliary fluorine separation units, the expression "fluorine separation unit" shall be understood to refer to the entire arrangement of such units. Main fluorine separation unit 44 can utilize any one of a variety of known and conventional methods for the removal of fluorine including scrubbing with caustic, e.g., aqueous potassium hydroxide, and/or reaction with one or more solid fluorine-reactive materials such as charcoal, caustic-impregnated activated carbon, alumina, calcium carbonate, calcium oxide and soda lime. In the embodiment shown and in accordance with the disclosure of U.S. Pat. No. 4,292,289, the contents of which are incorporated by reference herein, main fluorine separation unit 44 is provided as a sorption/desorption unit filled with sintered pellets 46 of anhydrous potassium nickel hexafluoride which converts to potassium nickel heptafluoride upon sorption of fluorine at a first elevated temperature, e.g., from about 225° to about 250° C., and fluorine residence times of from about 100 to about 1000 seconds with fluorine removal efficiencies of from about 60 to about 90 percent. At a second more elevated temperature, e.g., from about 350° to about 500° C., potassium nickel heptafluoride will release sorbed fluorine of high purity, e.g., of greater than about 99 percent purity, which is entirely suitable for recycle. Thus, the operation of unit 44 can be readily switched from the fluorine sorption mode to the fluorine desorption mode and vice versa simply by adjusting the internal temperature of the unit to within the range required by the particular mode of operation desired. Electric heating coil 45 is one suitable means for providing such temperature control. During operation of unit 44 in the fluorine desorption mode, desorbed fluorine is conveyed from unit 44 through transfer line 47 across valve 48 by pump 49 to desorbed fluorine holding tank 50. When the use of recycled fluorine is desired, pump 53 transfers desorbed fluorine from holding tank 50 through line 51 across valve 52 and through line 54 into mold cavity 14. Operation of main fluorine sorption/desorption unit 44 makes it possible to repeatedly recycle excess fluorine with only periodic additions of fresh fluorine from cylinder 37 being necessary to make up for the relatively small amounts of fluorine which are actually consumed in any one cycle of the preform surface treatment operation. Any fluorine not sorbed in main fluorine separation unit 44 is completely and irreversibly sorbed in auxiliary fluorine separation unit 56 operated in any known manner, e.g., as described in any of U.S. Pat. Nos. 2,515,112; 4,215,096; and, 4,594,231, the contents of which are incorporated by reference herein. The gas released through vent line 57 is entirely free of fluorine and as such is environmentally safe.

A complete cycle of operation of the reaction injection molding apparatus of FIGS. 1–3 to provide finished bathtub 32 will now be described. Prior to joining mold elements 11 and 12 to provide sealed mold 10, it is preferred to place a fiber reinforcement component, e.g., self-supporting glass fiber web preform 29, in the female mold cavity, preferably together with plywood plank 30 to provide additional longitudinal stiffening in the finished bathtub. After proper positioning of preform 27 with respect to the male and female mold shaping surfaces, the mold is sealed and fluorine gas from cylinder 37 or holding tank 49 is introduced into mold cavity 14 as previously described where it mixes with the oxygen of the resident air, the resulting mixture effecting the chemical activation of exposed surface 28 of the preform. Following completion of the surface treatment operation, excess fluorine in mold cavity 14 together with the gas with which it is admixed, e.g., air, is conveyed therefrom to main fluorine separation unit 44 where most of the fluorine is removed with complete fluorine removal being achieved in auxiliary fluorine separation unit 58 as previously described. Evacuation of the fluorine-containing gas from mold cavity 14 at the conclusion of the surface treatment operation can be accomplished by pump 42 or by introduction of thermoset resin-forming composition 31 into mold cavity 14 during the injection operation, preferably the former. In the case where the fluorine-containing atmosphere in mold cavity 14 is evacuated therefrom prior to the mold cavity filling operation, air drawn into mold cavity 14 through parting line 13 and/or through a one-way valve (not shown) will displace the fluorine-containing gas as it withdrawn through line 52 by pump 54. Then, during the mold filling operation, in-coming thermoset resin-forming composition 42 will itself displace the air in cavity 14 forcing the air through parting line 13 and/or other suitable gas venting means.

As shown in FIG. 1, sealed reaction injection mold 10 is in the recirculation mode of operation with reaction Component A, e.g., polyol, recirculating along path 21 of mixing head 19 and reaction Component B, e.g., polyisocyanate, recirculating along path 22. In the injection mode of operation shown in FIG. 2, hydraulic piston 20 has been drawn away from injection port 26 permitting Components A and B to become substantially completely mixed in high pressure impingement mixing zone 25 thereby forming thermoset resin-forming composition 31. At the conclusion of the injection cycle and as shown in FIG. 3, piston 20 returns to the recirculation position. Within minutes depending on the polymerization characteristics of the particular thermoset resin-forming composition being processed, cured thermoset resin 31' is obtained. The term "cured" as applied to thermoset resin 31' is intended to refer to an advanced state of polymerization at which the thermoset resin is self-supporting and can be demolded.

For finished bathtub 32, it is preferred to employ a resin-forming composition which provides a rigid, dense microcellular polyester-polyurethane hybrid foam derived from an unsaturated polyester, an unsaturated monomer such as styrene and a polyisocyanate such as MDI or TDI. Foam densities of from about 200 to about 800 kg/m$^3$, and preferably from about 300 to about 600 kg/m$^3$, are generally suitable for thermoset resin backing layer 31' of bathtub 32 and the backing layer of other sanitary ware products. The polyester-polyurethane hybrid resin-forming composition can also contain one or more additional components such as catalyst for the isocyanate addition reaction, free radical initiator, non-reinforcing particulate filler, chopped fiber reinforcement (whether or not reinforcement 29 is also employed), extender such as a hydrocarbon oil, flame retardant such as alumina trihydrate, surface active agent, physical blowing agent such as carbon dioxide, halocarbon, and the like, chemical blowing agent such as water and the like, in the usual amounts. Compositions of this type are known, e.g., from U.S. Pat. Nos. 3,823,099; 3,882,189; 4,216,294; 4,280,979; 4,358,548; 4,374,229, 4,822,849; 4,844,944; and, 4,844,955, the disclosures of which are incorporated by reference herein. Other thermoset resins which can be utilized in the laminate of this invention include polyurethanes, polyurethane-polyureas, polyureas, epoxy resins, allyl resins, thermosetting polyesters, thermosetting polyamides, polycaprolactone/polyether hybrids, thermosetting acrylic resins, and the like.

Due, it is believed, to chemical reaction between one or more components of thermoset resin-forming composition 31 and treated surface 28 of preform 27, the resulting finished bathtub 32 possesses an attractive outer rigid thermoplastic layer chemically bonded to an underlying fiber-reinforced and longitudinal stringer-stiffened thermoset resin backing layer. The thickness of the two layers can vary substantially, e.g., rigid thermoplastic resin preform 27 can possess an average thickness of from about 0.5 to about 10 mm, preferably from about 1 to about 5 mm, and cured thermoset resin layer 31' can possess an average thickness of anywhere from about 2 to about 30 times, and preferably from about 5 to about 20 times, the average thickness of preform 27.

What is claimed is:

1. A polymeric resin laminate which comprises:
   a) a rigid layer of thermoplastic resin possessing a molecularly-modified, adhesion-improved surface, the properties of the bulk resin remaining substantially unaffected by the molecular modification of such surface; and,
   b) a thermoset resin layer in adherent contact with, and chemically bonded to, the molecularly-modified adhesion-improved surface of rigid layer (a).

2. The polymeric resin laminate of claim 1 wherein the thermoplastic resin rigid layer (a) is selected from the group consisting of polyolefin, polyvinyl ether, poly(phenylene ether), acetal resin, thermoplastic polyester, polycarbonate, cellulose ester, thermoplastic polyamide, thermoplastic polyurethane, polyvinylhalide, polyvinylidene halide, halogenate polyolefin, acrylic resin, ionomer resin, polystyrene, polyacrylonitrile; polyvinylester, polyimide, polyetherimide, polysulfone, interpenetrating polymer network, simultaneous interpenetrating polymer network and alloy or blend of two or more of the foregoing and thermoset layer (b) is selected from the group consisting of polyurethane, polyurethane-polyurea, polyurea, epoxy resin, allyl resin, thermosetting polyester, polyester-polyurethane hybrid, thermosetting acrylic resin.

3. The polymeric resin laminate of claim 1 wherein the molecularly-modified, adhesion-improved surface of rigid layer (a) is obtained by treatment of the surface of rigid layer (a) by electron bombardment.

4. The polymeric resin laminate of claim 1 wherein the molecularly-modified, adhesion-improved surface of rigid layer (a) is obtained by treatment of the surface of rigid layer (a) by corona discharge.

5. The polymeric resin laminate of claim 1 wherein the molecularly-modified, adhesion-improved surface of rigid layer (a) is obtained by treatment of the surface of rigid layer (a) by radio frequency glow discharge at low pressure.

6. The polymeric resin laminate of claim 1 wherein the molecularly-modified, adhesion-improved surface of rigid layer (a) is obtained by treatment of the surface of rigid layer (a) with a chemically reactive gas or gaseous mixture.

7. The polymeric resin laminate of claim 1 wherein the molecularly-modified, adhesion-improved surface of rigid layer (a) is obtained by treatment of the surface of rigid layer (a) with a chemically reaction gaseous mixture comprising fluorine and at least one other reactive gas.

8. The polymeric resin laminate of claim 1 wherein the molecularly-modified, adhesion-improved surface of rigid layer (a) is obtained by treatment of the surface of rigid layer (a) with a chemically reactive gaseous mixture comprising fluorine and oxygen.

9. The polymeric resin laminate of claim 1 wherein thermoset resin layer (b) is a rigid thermoset resin.

10. The polymeric resin laminate of claim 1 wherein thermoset resin layer (b) is a rigid, dense microcellular thermoset resin foam.

11. The polymeric resin laminate of claim 1 wherein thermoset resin layer (b) is a rigid, dense microcellular polyester-polyurethane hybrid foam.

12. The polymeric resin laminate of claim 1 provided as an article of sanitary ware in which rigid layer (a) is fabricated from an acrylic resin and thermoset layer (b) is a particle-filled, fiber-reinforced, rigid, dense microcellular thermoset resin foam.

13. The polymeric resin laminate of claim 12 wherein the thermoset resin is a polyester-polyurethane hybrid resin.

14. The polymeric resin laminate of claim 12 wherein the article of sanitary ware is a bathtub.

15. The polymeric resin laminate of claim 14 wherein the thermoset resin is a polyester-polyurethane hybrid resin.

16. The polymeric resin laminate of claim 1 wherein rigid layer (a) possesses an average thickness of from about 0.5 to about 10 mm and thermoset resin layer (b) possesses an average thickness of from about 2 to about 30 times the average thickness of rigid layer (a).

17. The polymeric resin laminate of claim 1 wherein rigid layer (a) possesses an average thickness of from about 1 to about 5 mm and thermoset resin layer (b) possess an average thickness of from about 5 to about 20 times the average thickness of rigid layer (a).

18. The polymeric resin laminate of claim 1 wherein rigid layer (a) possesses an average thickness of from about 0.5 to about 10 mm and thermoset resin layer (b) is a rigid thermoset resin possessing an average thickness of from about 2 to about 30 times the average thickness of rigid layer (a).

19. The polymeric resin laminate of claim 1 wherein rigid layer (a) possesses an average thickness of from about 1 to about 5 mm and thermoset resin layer (b) is a rigid thermoset resin possessing an average thickness of from about 5 to about 20 times the average thickness of rigid layer (a).

20. The polymeric resin laminate of claim 1 wherein rigid layer (a) possesses an average thickness of from about 0.5 to about 10 mm and thermoset resin layer (b) is a rigid dense microcellular thermoset resin possessing an average thickness of from about 2 to about 30 times the average thickness of rigid layer (a).

21. The polymeric resin laminate of claim 20 wherein thermoset resin layer (b) possesses a density of from about 200 to about 800 kg/m$^3$.

22. The polymeric resin laminate of claim 21 wherein thermoset resin layer (b) possesses a density of from about 300 to about 600 kg/m$^3$.

23. The polymeric resin laminate of claim 1 wherein rigid layer (a) possesses an average thickness of from about 1 to about 5 mm and thermoset resin layer (b) is a rigid dense microcellular thermoset resin possessing an average thickness of from about 5 to about 20 times the average thickness of rigid layer (a).

24. The polymeric resin laminate of claim 23 wherein thermoset resin layer (b) possesses a density of from about 200 to about 800 kg/m$^3$.

25. The polymeric resin laminate of claim 24 wherein thermoset resin layer (b) possesses a density of from about 300 to about 600 kg/m$^3$.

26. The polymeric resin laminate of claim 1 wherein rigid layer (a) possesses an average thickness of from about 0.5 to about 10 mm and thermoset resin layer (b) is a rigid dense microcellular polyester-polyurethane hybrid foam possessing an average thickness of from about 2 to about 30 times the average thickness of rigid layer (a).

27. The polymeric resin laminate of claim 26 wherein thermoset resin layer (b) possesses a density of from about 200 to about 800 kg/m$^3$.

28. The polymeric resin laminate of claim 27 wherein thermoset resin layer (b) possesses a density of from about 300 to about 600 kg/m$^3$.

29. The polymeric resin laminate of claim 1 wherein rigid layer (a) possesses an average thickness of from about 1 to about 5 mm and thermoset resin layer (b) is a rigid dense microcellular polyester-polyurethane hybrid foam possessing an average thickness of from about 5 to about 20 times the average thickness of rigid layer (a).

30. The polymeric resin laminate of claim 29 wherein thermoset resin layer (b) possesses a density of from about 200 to about 800 kg/m$^3$.

31. The polymeric resin laminate of claim 30 wherein thermoset resin layer (b) possesses a density of from about 300 to about 600 kg/m$^3$.

* * * * *